United States Patent [19]

Komai et al.

[11] 3,960,823

[45] June 1, 1976

[54] HYDROCARBON RESINS AND COMPOSITIONS THEREOF

[75] Inventors: Hisataka Komai; Atsuo Ishikawa, both of Kawasaki, Japan

[73] Assignee: Nippon Zeon Co., Ltd., Tokyo, Japan

[22] Filed: Apr. 18, 1974

[21] Appl. No.: 461,826

Related U.S. Application Data

[63] Continuation-in-part of Ser. No. 308,920, Nov. 22, 1972, abandoned.

[30] Foreign Application Priority Data

Nov. 24, 1972   Japan............................... 46-94259
Feb. 16, 1972   Japan............................... 47-16252
Feb. 16, 1972   Japan............................... 47-16253

[52] U.S. Cl.................................... 526/237; 260/5; 260/897 A; 260/897 B; 526/283; 526/308; 526/339; 526/350
[51] Int. Cl.$^2$.................... C08F 232/04; C08F 2/06
[58] Field of Search.................... 260/80.7, 82, 82.1; 450/736, 744

[56] References Cited

UNITED STATES PATENTS

| | | | |
|---|---|---|---|
| 2,753,325 | 7/1956 | Banes et al. | 260/82 |
| 3,048,562 | 8/1962 | Cull et al. | 260/82 |
| 3,509,239 | 4/1970 | Tindall | 260/82 |
| 3,520,856 | 7/1970 | Dall'Asta | 260/82.1 |
| 3,577,398 | 5/1971 | Pace et al. | 260/82 |
| 3,709,854 | 1/1973 | Hepworth et al. | 260/82 |
| 3,763,125 | 10/1973 | Moody et al. | 260/81 |
| 3,793,261 | 2/1974 | Katayama et al. | 260/82 |
| 3,817,953 | 6/1974 | Younger | 260/82 |

*Primary Examiner*—Stanford M. Levin
*Attorney, Agent, or Firm*—Ladas, Parry, Von Gehr, Goldsmith & Deschamps

[57] ABSTRACT

Hydrocarbon resins having a softening point of 60°–140°C and a Gardner color of 6 or less and having excellent cohesive strength and thermal stability prepared by copolymerizing 1,3-pentadiene and cyclopentene, together with, if desired, 1,3-butadiene or isobutene and small amounts of incidental other olefins in the presence of aluminum chloride.

1 Claim, No Drawings

HYDROCARBON RESINS AND COMPOSITIONS THEREOF

This application is a continuation-in-part of U.S. application Ser. No. 308,920, filed Nov. 22, 1972, now abandoned.

This invention relates to a novel process for the preparation of a hydrocarbon resin and also to the hydrocarbon resin. It relates more particularly to an industrially useful process for the preparation of a hydrocarbon resin by polymerizing a monomeric mixture comprising 1,3-pentadiene and cyclopentene in the presence of aluminum chloride and also to the hydrocarbon resin.

It has heretofore been known that the cationic polymerization of 1,3-pentadiene gives various polymers having their own specific properties. For example, it is known to produce a viscous liquid polymer by polymerizing 1,3-pentadiene using an alkylaluminum dihalide as the catalyst in toluene (U.S. Pat. No. 3,446,785). It is also known that a $C_5$ fraction containing 1,3-pentadiene is polymerized at a temperature of from $-5°C$ to $+70°C$ in the presence of aluminum chloride and then continues to be polymerized at a temperature of from $-100°C$ to $-10°C$, thereby producing gel-like polymers which are insoluble in solvents (Japanese Patent Gazette 1227/72). Although these polymers can be used for specific purposes depending on their specific properties, they are not so valuable from the view-point of industrial use and have been unsuitable for use in preparing hot melt-type binders or adhesives in which particularly resin, rosin ester and terpene resin are mainly usable. In addition, the polymerization of cyclopentene using a metallic halide catalyst of Friedel-Crafts type has hardly been tried up to now and, even if actually attempted to be carried out, such polymerization will not take place or will give only an oily low molecular weight polymer thereby indicating that it is of little industrial value.

Terpene resins obtainable by polymerizing $\beta$-pinene have heretofore been widely used as hot melt-type adhesives and other tackifiers since they attract users' attention because of their superior peel (adhesive strength), cohesive strength, tack (initial tackiness) and thermal stability. Because the terpene resins are expensive, on the other hand, there have been eager demands for less expensive substitutes therefor and aliphatic hydrocarbon resins have recently been used in place of the terpene resins in a certain part of the industrial field. Although the aliphatic hydrocarbon resins are obtained at a low cost since they are easily produced by the cationic polymerization of a petroleum fraction having a suitable range of boiling point (such as naphtha), they are inferior in physical properties such as cohesive strength and thermal stability even if their softening point is approximately 100°C and, therefore, they are not appreciated to be fully satisfactory in performance as a substitute for the terpene resins.

In addition, an attempt to improve polymers of 1,3-pentadiene has been made with the result that there was found a process for preparing polymers having a softening point of from 80° to 100°C by the cationic polymerization of a monomeric mixture containing 20-75% by weight of 1,3-pentadiene and 80-25% by weight of 2-methylbutene-2 (British Patent No. 1161007). These polymers are superior in tack and useful as a tackifier for synthetic rubbers but they do not allow adhesive tapes wherein they are used as the adhesive to have enough cohesive strength; there have therefore been desired the development of new hydrocarbon resins having more excellent cohesive strength.

As a result of studies strenuously made by the present inventors in an attempt to obtain hydrocarbon resins usable as a substitute for the terpene resins, it has been found that the cationic polymerization of a monomeric mixture containing 1,3-pentadiene and cyclopentene will give new polymers having properties which would be unable to be anticipated from those of the heretofore known polymers of 1,3-pentadiene.

An object of this invention is to provide a process for the preparation of a new hydrocarbon resin which is softened at 60°–140°C, soluble in hydrocarbons and superior in cohesive strength and thermal stability.

Another object of this invention is to provide the hydrocarbon resin.

The objects of this invention are attained by polymerizing a monomeric mixture composed substantially of (A) 40–90% by weight of 1,3-pentadiene, (B) 10–60% by weight of cyclopentene and (C) 0–15% by weight of 1,3-butadiene or isobutene, the monomeric mixture being allowed to contain not more than 2% by weight of each of (D) isoprene, (E) cyclopentadiene and (F) dicyclopentadiene together with other $C_4$-$C_6$ olefins in such amounts that the total of said three diolefins (D)-(F) and other $C_4$-$C_6$ olefins is not more than 5% by weight, in a solvent containing aromatic hydrocarbons in not less than 50% by weight at temperatures of 0°–80°C in the presence of aluminum chloride as a catalyst, thereby obtaining a hydrocarbon resin which has a softening point of 60°–140°C and is soluble in a hydrocarbon solvent.

Aluminum chloride may be used as a catalyst for polymerization in the practice of this invention. Since it is important to ensure a satisfactory contact between the monomeric mixture and catalyst in the practice of polymerization reaction, the catalyst should be usually of a 5–200 mesh size and preferably of a 20–200 mesh size and, however, its size can be larger or smaller without being limited to said ones. The catalyst is not specifically limited in amount used and, however, it should be used in such amounts as to effect a satisfactory polymerization reaction. The catalyst may be added to the monomeric mixture, and vice versa, and both may simultaneously be introduced to a reactor if desired. The polymerization reaction is effected in the known way whether it is carried out in a batch or continuous fashion.

The solvents which may be used are aromatic hydrocarbons which typically include benzene, monochlorobenzene, toluene, xylene and the like. Since the polymerization reaction is usually an exothermic one, the reaction temperature may advantageously controlled by the presence of an diluent in the reaction system. However, the use of aliphatic hydrocarbons such as pentane and hexane as a solvent for the polymerization will give gel-like polymers which are insoluble in hydrocarbons, and the use of halogen-containing solvents such as dichloromethane and carbon tetrachloride will result in the production of polymers which have a low softening point or are gel-like and insoluble in hydrocarbons. It is thus essential to use an aromatic hydrocarbon or hydrocarbons as all or part of the solvent for the polymerization to attain the object of this invention, and the polymerization solvent should contain at least one kind of aromatic hydrocarbon in amounts of at least 50% by weight thereof. If the polymerization solvent used should contain at least 50% by weight of such solvent as pentane, hexane, cyclopentane or dichloromethane, there will undesirably be produced gel-like or low softening polymers. The polymerization solvent is usually used in amounts by weight of 20-1,000 parts, preferably, 50-500 parts per 100 parts by weight of the monomeric mixture.

The monomeric mixture which may be used in this invention consists substantially of (A) 40–90% by weight of 1,3-pentadiene, (B) 10–60% by weight of cyclopentene and (C) 0–15% by weight of 1,3-butadiene or isobutene. The use of more than 90% by weight of 1,3-pentadiene will result in gel formation being not prevented and, on the contrary, the use of less than 40% by weight thereof will result in the production of a hydrocarbon resin having a low softening point in a low yield. According to this invention, even if the monomeric mixture used contains only 1,3-pentadiene and cyclopentene, it will give a hydrocarbon resin having excellent cohesive strength and thermal stability; however, if such a two-component mixture is used together with small amounts of 1,3-butadiene or isobutene, then it will give a hydrocarbon resin having a further improved color and adhesiveness. The use of too much of 1,3-butadiene and/or isobutene will give a hydrocarbon resin having a low softening point in a decreased yield, and the thus-given resin when applied to a tape to form an adhesive tape will be liable to cause the adhesive tape to be cohesively destroyed. Therefore, 1,3-butadiene and/or isobutene may be used in the amounts of not more than 15%, preferably 3–12%, by weight of the total monomers.

In addition, according to this invention, it is necesary to make as small as possible the amount of isoprene, cyclopentadiene and dicyclopentadiene contained in the monomeric mixture. More particularly, it is required that the content of each of said three olefins in the monomeric mixture be limited to not more than 2% by weight, and it is further required that the total amount of said three diolefins and other $C_4$-$C_6$ olefins present in the monomeric mixture be limited to not more than 5% by weight. The failure to meet with these requirements in the preparation of hydrocarbon resins will result in the production, accompanied with gel formation, of those which are inferior in color, thermal stability, compatibility with rubber, and the like.

The polymerization reaction is usually carried out at a temperature of from 0° to 80°C, and the pressure in the reaction system may be equal to atmospheric pressure or may be higher or lower than the atmospheric pressure. The reaction time is not a critical factor and it may vary between several seconds and 12 hours or longer. The polymer thus obtained is treated and dried by the use of the usual techniques.

The polymers obtained according to this invention are resinous ones which have a Gardner color of 6 or lower as measured by ASTM D1544-63T, a softening point of 60°–140°C, an iodine value of 20–100 as measured by Wijs method and a specific gravity of from 0.95 to 1.00 and which are soluble in aliphatic, aromatic or halogenated hydrocarbon solvents such as pentane, hexane, benzene, xylene, chloroform and carbon tetrachloride. These resinous polymers are compatible with natural rubber; various synthetic rubbers; synthetic resins such as polyethylene and vinyl acetate-ethylene copolymers; natural resins such as polyterpenes and resin; various waxes; and the like.

In addition, the polymers or hydrocarbon resins according to this invention are excellent in water repellency, adhesiveness, cohesive strength, peel, thermal stability, resistance to the ultraviolet rays, etc., they are mixed with natural or synthetic rubber to form a mixture which is particularly useful as a tackifier composition for adhesive tapes and they are used as a modifier for providing rubbers with tackiness and further used for many other purposes.

This invention will be better understood by the following examples wherein all parts are by weight unless otherwise specified.

The processes for the preparation of the hydrocarbon resins are illustrated below.

EXAMPLE 1–4

In Example 1, 250 parts of benzene and 3.0 parts of aluminum chloride of a 40-mesh size were charged into a 500-ml glass-made flask to form a mixture thereof which was cooled to 5°C and then incorporated with 100 parts of a hydrocarbon mixture of the following composition slowly and continuously over a period of 60 minutes while agitating. After said incorporation the polymerization reaction system thus obtained was kept agitated at 5°–10°C for 120 minutes and then incorporated with about 100 parts of water to decompose the aluminum chloride. The solid particles created by said decomposition in the reaction mixture were filtered out to obtain a filtrate which was washed with water, separated from the water layer and then treated to separate the obtained polymer from the unreacted hydrocarbons and the solvent. The polymer thus separated was heated to 200°C and kept at this temperature for about 4 hours while blowing nitrogen into a vessel in which the polymer was placed, thereby removing the lower polymers produced by the polymerization reaction and the remaining solvent. The residue left melted in the vessel was withdrawn therefrom and then allowed to cool at ambient temperatures thereby to obtain a resinous substance which was light yellow to yellow in color. The composition of the hydrocarbon mixture used is indicated below:

| Ingredients | Parts |
|---|---|
| 1,3-pentadiene | 62.4 |
| Cyclopentene | 14.5 |
| 2-methyl-butene-2 | 1.2 |
| Cyclopentane | 8.4 |
| Isoprene | 1.0 |
| Other saturated hydrocarbons having 5–6 carbon atoms | 11.4 |
| Other unsaturated hydrocarbons having 5–6 carbon atoms | 1.1 |
| Total | 100.0 |

(Cyclopentene/Cyclopentene + 1,3-pentadiene) × 100 = 18.9

In Examples 2–4, the procedure of Example 1 was followed with the exception that as the solvent the benzene was respectively substituted by toluene, chlorobenzene and a mixture of 70 parts of benzene with 30 parts of n-hexane.

For comparison, in Reference examples 1–3 the procedure of Example 1 was also followed except that cyclohexane, dichloromethane and carbon tetrachloride, which are all non-aromatic hydrocarbons, were respectively used in substitution for the benzene.

Table 1

|  | Solvent | *1 Yield (%) | *2 Softening Point (°C) | *3 Chromaticity | Gel Formed |
|---|---|---|---|---|---|
| Example 1 | Benzene | 71.4 | 102.0 | 4 | None |
| Example 2 | Toluene | 90.4 | 83.5 | 5 | " |
| Example 3 | Chlorobenzene | 66.0 | 134.0 | 6 | " |
| Example 4 | Benzene (70 parts) +n-Hexane (30 parts) | 63.7 | 122.0 | 4 | " |
| Reference example 1 | Cyclohexane | 26.0 | 84.0 | 7 | Large Amount |
| example 2 | Dichloromethane | 26.9 | 61.0 | 7 | " |
| example 3 | Carbon tetrachloride | 43.1 | Balsamic | 8 | " |

Notes:

$$*1 \quad \frac{\text{Amount by weight of polymer formed (except gel formed)}}{\text{Sum of amounts by weight of 1,3-pentadiene and cyclopentene}} \times 100\%$$

*2 Measured by the ring and ball method prescribed in JIS K-2531
*3 Gardner color prescribed in ASTM D 1544-16T It is seen from Table 1 that the use of the aromatic hydrocarbon as the solvent gave the polymer which is free of gel and excellent in coloration.

EXAMPLE 5-7

In these Examples, the procedure of Example 1 was followed except that the reaction was effected at 45°-50°C and the mixed hydrocarbons to be polymerized were respectively those indicated by the symbols A, B and C in Table 2.

For comparison, in Reference example 4, the procedure of Example 1 was also followed using D as the mixed hydrocarbons being polymerized.

The results are shown in Table 3.

Table 2

| Ingredients | A | B | C | D |
|---|---|---|---|---|
|  | (Parts) | | | |
| 1,3-pentadiene | 75.5 | 62.4 | 44.8 | 22.4 |
| Cyclopentene | 8.5 | 14.5 | 54.1 | 77.0 |
| 2-methyl-butene-2 | 0.7 | 1.2 | 0.4 | 0.2 |
| Cyclopentane | 1.6 | 8.4 | 0.1 | 0.1 |
| Isoprene | 0.3 | 1.0 | 0.1 | 0.1 |
| Other saturated hydrocarbons having 5-6 carbon atoms | 12.2 | 11.4 | 0.1 | 0.1 |
| Other unsaturated hydrocarbons having 5-6 carbon atoms | 1.2 | 1.1 | 0.4 | 0.1 |
| $\frac{\text{Cyclopentene}}{\text{Cyclopentene+1,3-pentadiene}} \times 100$ | 10.1 | 18.9 | 54.7 | 77.2 |

Table 3

|  | Mixed Hydrocarbons | Solvent | Yield (%) | Softening Point (°C) | Chromaticity | *Iodine Value |
|---|---|---|---|---|---|---|
| Example 5 | A | Benzene | 79.3 | 123.5 | 4 | 37.0 |
| Example 6 | B | " | 78.5 | 121.0 | 4 | 38.0 |
| Example 7 | C | " | 73.4 | 106.0 | 4 | 38.5 |
| Reference example 4 | D | " | 51.6 | Balsamic | 5 | 43.2 |

Note: *4 Measured by Wijs method

From Table 3, it is apparent that the polymer obtained from A, B or C each containing cyclopentene in amounts of up to 60% by weight has a satisfactorily high softening point, while the polymer obtained from D containing more than 60% by weight of cyclopentene has a lower softening point and its yield is low.

EXAMPLE 8

In this Example the procedure of Example 1 was followed with the exception that E was used as the mixed hydrocarbons being polymerized and the polymerization reaction was conducted at 15°-20°C. For comparison, in Reference examples 5, 6 and 7 the procedure was also followed except that F, G and H were respectively used as the mixed hydrocarbons and the reaction was effected at 15°-20°C. The mixed hydrocarbons E, F, G and H had the compositions as indicated in Table 4.

The results are shown in Table 5.

Table 4

| Ingredients | E | F | G | H |
|---|---|---|---|---|
| | (Parts) | | | |
| 1,3-pentadiene | 62.4 | 58.2 | 59.3 | 56.2 |
| Cyclopentene | 14.5 | 13.5 | 13.8 | 13.0 |
| Isoprene | 1.0 | 8.0 | 1.0 | 1.0 |
| Cyclopentadiene | — | — | 5.0 | — |
| Dicyclopentadiene | — | — | — | 9.9 |
| 2-methyl-butene-2 | 1.2 | 1.1 | 1.1 | 1.1 |
| Cyclopentane | 8.4 | 7.7 | 8.0 | 7.6 |
| Other saturated hydrocarbons having 5–6 carbon atoms | 11.4 | 10.5 | 10.8 | 10.2 |
| Other unsaturated hydrocarbons having 5–6 carbon atoms | 1.1 | 1.0 | 1.0 | 1.0 |
| $\frac{\text{Cyclopentene}}{\text{Cyclopentene}+1,3\text{-pentadiene}} \times 100$ | 18.9 | 18.8 | 18.9 | 19.1 |

Table 5

| | Example 8 | Reference example 5 | Reference example 6 | Reference example 7 |
|---|---|---|---|---|
| Mixed Hydrocarbons | E | F | G | H |
| Solvent | Benzene | Benzene | Benzene | Benzene |
| Yield (%) | 73.2 | 70.5 | 71.4 | 32.6 |
| Softening Point (°C) | 110.0 | 119.0 | 117.0 | 121.5 |
| Chromaticity | 5 | 7 | 7 | 8 |
| Gel Formed | None | Small amount | Large amount | Large amount |

From Table 5 it is seen that the unduly increased content of cyclopentadiene or dicyclopentadiene in the mixed hydrocarbons G and H caused gel formation and less desirable hue, and that the unduly high content of isoprene in the mixed hydrocarbons also caused somewhat inferior hue. In addition, as indicated in the Experiment to be described later, the resinous polymers obtained from F, G and H are unsatisfactory in compatibility with rubbers and they have a disadvantage that they will cause white turbidity if mixed with the rubbers.

EXAMPLE 9

The procedure of Example 1 was followed except that toluene was used as the solvent and the polymerization reaction was carried out at 15°C. There were thus obtained 93.2 parts of a resinous polymer having a Gardner color of 5 and a softening point of 66°C.

EXAMPLES 10–16

The procedure of Example 1 was followed except that the mixtures I-Q were each used as the hydrocarbon mixture, 1.5 parts of aluminum chloride were used as the catalyst and the reaction was effected at 45°C, with the result being indicated in Table 7.

Table 6

| Ingredients | I | J | K | L | M | N | O | P | Q |
|---|---|---|---|---|---|---|---|---|---|
| | | | | | (Parts) | | | | |
| 1,3-pentadiene | 78.5 | 74.7 | 71.0 | 67.5 | 60.4 | 74.6 | 70.8 | 67.5 | 59.7 |
| Cyclopentene | 17.0 | 16.2 | 15.3 | 14.6 | 13.1 | 16.2 | 15.3 | 14.6 | 12.9 |
| Isoprene | t | t | t | t | t | t | t | t | t |
| Cyclopentadiene | 0.3 | 0.3 | 0.3 | 0.3 | 0.2 | 0.3 | 0.3 | 0.3 | 0.3 |
| Dicyclopentadiene | t | t | t | t | t | t | t | t | t |
| 1,3-butadiene | — | 4.8 | 9.6 | 14.0 | 23.0 | — | — | — | — |
| Isobutene | — | — | — | — | — | 4.9 | 9.8 | 14.0 | 24.0 |
| Cyclopentane | 4.0 | 3.8 | 3.6 | 3.5 | 3.1 | 3.8 | 3.6 | 3.4 | 3.0 |
| Other saturated hydrocarbons having 5–6 carbon atoms | 0.2 | 0.2 | 0.2 | 0.2 | 0.2 | 0.2 | 0.2 | 0.2 | 0.2 |
| Other unsaturated hydrocarbons having 5–6 carbon atoms | t | t | t | t | t | t | t | t | t |
| $\frac{\text{Cyclopentene}}{\text{Cyclopentene}+1,3\text{-pentadiene}} \times 100$ | 17.8 | 17.8 | 17.7 | 17.8 | 17.8 | 17.8 | 17.8 | 17.8 | 17.8 |

Ramarks: t = trace

Table 7

| | Ex. 10 | Ex. 11 | Ex. 12 | Ex. 13 | Ref., Ex. 8 | Ex. 14 | Ex. 15 | Ex. 16 | Ref. Ex. 9 |
|---|---|---|---|---|---|---|---|---|---|
| Mixed Hydrocarbons | I | J | K | L | M | N | O | P | Q |
| Solvent | Benzene | Benzene | Benzene | Benzene | Benzene | Benzene | Benzene | Benzene | Benzene |
| Yield (%) | 74.2 | 76.3 | 75.3 | 77.2 | 56.7 | 69.0 | 68.6 | 65.3 | 42.6 |
| Softening Point (°C) | 108.0 | 79.0 | 67.5 | 61.0 | 48.5 | 92.5 | 79.5 | 70.5 | 51.5 |
| Chromaticity | 4 | 3 | 3 | 4 | 4 | 3 | 3 | 3 | 4 |
| Gel Formed | None | None | None | None | None | None | None | None | None |

From this Table it is seen that the use of small amounts of 1,3-butadiene or isobutene in the monomeric mixture will give a resin having an improved hue or color, and that with the increase of said olefin in amount used the softening point and yield of the resulting resin will accordingly be lowered. Therefore, such olefins should preferably be used in the amounts of 15% or less by weight of the total monomers.

EXAMPLE 17

A portion of each of the various resins indicated in Table 8 was placed in a 300-ml beaker made of a stainless steel, and heated to 180°C in the air thereby testing the resin for its change in melt viscosity with the lapse of time at this temperature. Separately, another portion of each of the resins was placed on an aluminum dish, heated to 180°C and kept at this temperature in the air thus testing it for its change in color with the lapse of time. The resins prepared in the Examples and Reference examples in this specification were subjected to the tests without previously incorporated with an anti-aging agent. The results are shown in Table 8.

in comparison with that of other hydrocarbon resins than said new ones, each of the hydrocarbon resins indicated in Table 9 was incorporated in natural rubber (pale crepe, Mooney viscosity $ML_{1+4/100°C}$ 82.5) in a ratio of 80 parts: 100 parts to form a tackifying composition thereof which was dissolved in 900 parts of toluene. The solution so obtained was applied to Cellophane-made type bases so that the composition is deposited thereon 25 $\mu$ thick to obtain adhesive Cellophane tapes which were then tested for their cohesive strength, U-peel and tack. The test for cohesive strength was made by applying the adhesive tape to a stainless steel plate polished with sandpaper of a 280-mesh size so that the area of the type applied Table 8

| Hydrocarbon resin | Ex. 10 | Ex. 11 | Ex. 14 | Ref. Ex. 5 | Ref. Ex. 6 | Ref. Ex. 7 | Piccopale* | Arkon** |
|---|---|---|---|---|---|---|---|---|
| Softening Point (°C) | 108.0 | 79.0 | 92.5 | 119.0 | 117.0 | 121.5 | 100.0 | 100.0 |
| Change in melt viscosity (Brookfield type viscosimeter) (cps) | | | | | | | | |
| After 4 hours | 2000 | 220 | 700 | 3500 | 3700 | 4000 | Decomposition and foaming | 1300 |
| 8 hours | 2500 | 170 | 600 | 4200 | 4100 | 5100 | | 700 |
| 12 hours | 2000 | 160 | 600 | 8200 | 9000 | 9100 | | 540 |
| 24 hours | 2500 | 180 | 920 | Sludge formed | Sludge formed | Sludge formed | | 600 |
| 36 hours | 4400 | 260 | 1000 | | | | | 4000 |
| Change in color (Gardner color) | | | | | | | | |
| After 0 hours | 4 | 3 | 3 | 7 | 7 | 8 | 11 | 1 or less |
| 1 | 5 | 4 | 4 | 10 | 9 | 12.5 | 17 | 2 |
| 3 | 6 | 5 | 5 | 11 | 13 | 13.5 | 17.5 | 3 |
| 6 | 6 | 6 | 6 | 13 | 15 | 14 | 18 | 4 |
| 12 | 7 | 7 | 7.5 | 15 | 15.5 | 14 | 19 | 5 |
| 24 | 8 | 7.5 | 8 | 16 | 17 | 17 | 19 or more | 7 |
| 48 | 8.5 | 8 | 8.5 | 17 | 17.5 | 18 | 19 or more | 11 |

Remarks:
*Piccopale-100: Aliphatic hydrocarbon resin produced by Pennsylvania Industrial Chemical Corp.
**Arkon P-100: Alicyclic hydrocarbon resin produced by Arakawa Rinsan Kagaku Kogyo K.K.

From the results shown in Table 8 it is seen that the hydrocarbon resins of this invention, without incorporation with an anti-aging agent, exhibit more excellent thermal stability than that known as Arkon (trademark) which is estimated to be one of the commercially available hydrocarbons having the most excellent thermal stability. The resins prepared by copolymerizing a monomeric mixture containing isoprene, cyclopentadiene and dicyclopentadiene in amounts exceeding the fixed level according to this invention, exhibited a remarkable change in melt viscosity with the lapse of time and showed the formation of sludge 24 hours after the start of the test thereby making it impossible to further measure the viscosity. The Piccopale already started to decompose, accompanied with vigorous foaming, 4 hours after the start of being heated thereby making it unable to further measure the viscosity thereof.

Experiment

To evaluate the usefulness of the new hydrocarbon resins according to this invention as a tackifying agent reached an area of 25 mm × 25 mm and then applying a load of 1 Kg to the portion of the tape applied in order to measure time needed for causing a 1-mm shear between the plate and the portion of the tape applied. The test for U-peel was made by applying the tape to a stainless steel plate treated in the same manner as above to the extent that an area of 25 mm in width × 100 mm in length of the tape applied was reached and measuring the peel at 25°C and at a velocity of 200 mm/min.

In accordance with J. Dow Method [Proc. Inst. Rub. Ind., 1, 105 (1954)], the hydrocarbon resin samples were tested for their tack by allowing 32 stainless steel-made balls to roll on a 30°-sloped stainless steel-made plate with a 10 cm long adhesive tape applied thereto in the slope direction, starting at the point of the sloped plate 10 cm upward from the upper end of the adhesive tape and at an initial velocity of zero in order to find the largest ball among those which are stopped on the adhesive tape, thus indicating the tack of the resin in terms of the diameter of the largest ball so found. The results are shown in Table 9.

Table 9

| Resin | Ex. 10 | Ex. 11 | Ex. 12 | Ex. 13 | Ref. Ex. 8 | Ex. 14 | Ex. 15 | Ex. 16 | Ref. Ex. 9 | Ref. Ex. 5 | Ref. Ex. 6 | Ref. Ex. 7 | Wing-[1] tack |
|---|---|---|---|---|---|---|---|---|---|---|---|---|---|
| Softening Point (°C) | 108.0 | 79.0 | 67.5 | 61.0 | 48.5 | 92.5 | 79.5 | 70.5 | 51.5 | 119.0 | 117.0 | 120.0 | 95 |
| Compatability with rubber | G[2] | G | G | G | G | G | G | G | G | SP | P[3] | SP | G |
| Cohesive strength (min.) | >70 | >70 | 52 | 36 | 12 | >70 | >70 | >70 | 17 | >70 | >70 | >70 | 24 |
| U-Peel (Kg/cm) | 0.25 | 0.20 | 0.19 | 0.13 | 0.10[5] | 0.24 | 0.22 | 0.18 | 0.11[6] | 0.22 | 0.21 | 0.19 | 0.21 |
| Tack | | | | | | | | | | | | | |

Table 9-continued

| Resin | Ex. 10 | Ex. 11 | Ex. 12 | Ex. 13 | Ref. Ex. 8 | Ex. 14 | Ex. 15 | Ex. 16 | Ref. Ex. 9 | Ref. Ex. 5 | Ref. Ex. 6 | Ref. Ex. 7 | Wing-[1] tack |
|---|---|---|---|---|---|---|---|---|---|---|---|---|---|
| (1/32 inch) | 10 | 23 | 25 | 27 | 18 | 15 | 20 | 22 | 19 | 4 | 3 | 3 | 17 |

Remarks:

[1] Wingstack-95 : Aliphatic hydrocarbon resin produced by Goodyear Tire & Rubber Co.
[2] Good.
[3] Poor.
[4] Somewhat poor
[5], [6] Cohesive destroy (or destruction)

From the results shown in Table 9, it is seen that the hydrocarbon resins of this invention are excellent in compatibility with natural rubber and are also very excellent in cohesive strength which is believed to be conflicting with the compatibility, and that the resins prepared by the copolymerization of the monomeric mixture containing 5–10% by weight of 1,3-butadiene or isobutene are particularly satisfactory and balanced in cohesive strength, peel resistance and adhesive strength and, therefore, they are suitable for use as a material for adhesive tapes. It is undesirable, however, that the resins should contain too much of 1,3-butadiene or isobutene units since such resins tend to cause cohesive destruction while in use. The Table 9 also shows that the resins containing isoprene, cyclopentadiene or dicyclopentadiene polymerization units in amounts exceeding the fixed level according to this invention, are inferior in compatibility with rubber, cause white turbidity when used in the preparation of adhesive tapes and are also inferior in adhesive strength to those of this invention when used in adhesive tapes as an adhesive.

What is claimed is:

1. Hydrocarbon resins having a softening point of 60°–140°C and a Gardner color of 6 or less and being soluble in a hydrocarbon solvent, prepared by polymerizing a monomeric mixture composed substantially of, based on the weight of the monomeric mixture, (A) 40–90% by weight of 1,3-pentadiene, (B) 10–60% by weight of cyclopentene and (C) 0–15% by weight of 1,3-butadiene or isobutene, the monomeric mixture being allowed to contain not more than 2% by weight of each of (D) isoprene, (E) cyclopentadiene and (F) dicyclopentadiene together with other $C_4$ - $C_6$ olefins in such amounts that the total of said three diolefins (D)-(F) and the other $C_4$ - $C_6$ olefins is not more than 5% by weight, in 20–1000 parts by weight per 100 parts by weight of the monomeric mixture, of a solvent containing not less than 50% by weight of aromatic hydrocarbons at temperatures of 0°–80°C in the presence of aluminum chloride as the catalyst.

* * * * *